US Patent [19] 4,168,803
Simmons et al. [45] Sep. 25, 1979

[54] AIR-EJECTOR ASSISTED FUEL NOZZLE

[75] Inventors: Harold C. Simmons, Richmond Heights; Robert T. Mains, Euclid; Frank Menti, Jr., Maple Heights, all of Ohio

[73] Assignee: Parker-Hannifin Corporation, Cleveland, Ohio

[21] Appl. No.: 829,330

[22] Filed: Aug. 31, 1977

[51] Int. Cl.² .......................... F02G 1/00; B05B 7/10
[52] U.S. Cl. ................. 239/400; 60/39.74 R; 239/406; 239/427.5; 417/167; 417/187
[58] Field of Search .................. 239/400, 403–406, 239/427.3, 427.5; 60/39.74 R; 417/167, 171, 179, 180, 187

[56] References Cited
U.S. PATENT DOCUMENTS

| 3,254,846 | 6/1966 | Schereter et al. | 239/400 |
| 3,283,502 | 11/1966 | Lefebvre | 60/39.74 R |
| 3,474,970 | 10/1969 | Simmons et al. | 239/404 |
| 3,722,218 | 3/1973 | Lapera | 60/39.74 R |
| 3,866,413 | 2/1975 | Sturgess | 239/400 X |
| 3,980,233 | 9/1976 | Simmons et al. | 239/400 |

FOREIGN PATENT DOCUMENTS

| 572840 | 3/1959 | Canada | 60/39.74 R |
| 505258 | 7/1920 | France | 239/403 |
| 259044 | 10/1926 | United Kingdom | 239/405 |

Primary Examiner—Robert B. Reeves
Assistant Examiner—Andres Kashnikow
Attorney, Agent, or Firm—John N. Wolfram

[57] ABSTRACT

A nozzle for atomizing fuel for combustion in a gas turbine engine. During normal operation of the engine, the nozzle uses a portion of the air supplied to the combustion chamber by the engine compressor to atomize fuel flowing through the nozzle. During start-up and low power operation of the engine when flow of engine air through the nozzle would otherwise be of insufficient velocity to cause good atomization of the fuel, additional air from a separate external source is introduced at high velocity into the nozzle in the manner of an ejector. The additional air imparts high velocity to the engine air within the nozzle so that the air from both sources acts on the fuel at the nozzle discharge orifice at high velocity to effect good atomization and spray pattern of the fuel. The nozzle is designed in such a manner as to cause no significant restriction of engine air flow through the nozzle under high power operation of the engine when the external air source is shut off.

8 Claims, 4 Drawing Figures

AIR-EJECTOR ASSISTED FUEL NOZZLE

FIELD OF THE INVENTION

This invention relates generally to nozzles for atomizing fuel for combustion in a gas turbine engine, and more specifically to nozzles that use engine air to atomize the fuel during normal high power operation of the engine and which use additional air from a separate external source to impart high velocity to the engine air during start-up and low power operation of the engine for effecting good atomization of the fuel.

DESCRIPTION OF THE PRIOR ART

In fuel atomizing nozzles for gas turbine engines it is well known to use air flowing through the nozzles at high velocity to assist in atomization of the liquid fuel. In one form of such nozzle, commonly referred to as an "air assisted" nozzle, compressed air from a source other than the engine is supplied to the nozzle for assisting in the atomization of the fuel, as for example, the nozzle disclosed in U.S. Pat. No. 3,474,970. In another form of nozzle, known as an "air blast" type, a portion of the air supplied to the combustion chamber by the engine compressor is directed through the nozzle to assist in atomization of the fuel. Such a nozzle is shown for example in U.S. Pat. No. 3,283,502.

Generally, there is reluctance to use air supplied only from a source separate of the engine compressor because of the high cost and complexity of air compressing equipment to supply enough air to the nozzle for proper atomization of the fuel over the entire operating range of the engine. On the other hand, in air blast nozzles wherein only air from the engine compressor is directed through the nozzle, the velocity of the air flow through the nozzle during engine start-up and low power operation may be insufficient to provide adequate atomization of the liquid fuel. To alleviate these problems, it has been heretofore proposed to use air from both the engine compressor and from an external source to assist in atomization of the fuel. One such device is disclosed in U.S. Pat. No. 3,866,413. It utilizes a series of circumferentially spaced small holes externally of the fuel passage through the nozzle to inject compressed air from a separate source into the engine air flow passage through the nozzle for assisting in the atomization of liquid fuel at engine start-up and low power operating conditions. However, the device disclosed in U.S. Pat. No. 3,866,413 has the following disadvantages:

(1) The large number of small holes required is costly to manufacture and susceptible to blockage by dirt;

(2) The high velocity compressed air passing through the small holes is in the form of discrete jets that may produce non-uniform spray; and (3) The position and direction of the small holes tends to produce a spray pattern of cylindrical shape as compared to a desired conical spray pattern having an included angle of about 80° to 90°.

SUMMARY OF THE INVENTION

The present invention provides a fuel nozzle that utilizes air from the engine during high power operation to atomize the fuel and utilizes air from a separate external souce during start-up and low power operation to impart high velocity to the engine air for achieving good fuel atomization under the latter conditions. The invention avoids the disadvantages of the nozzle disclosed in U.S. Pat. No. 3,866,413 by introducing the air from the separate source through a single, relatively large opening into the central portion of a circular passage through which engine air flows through the nozzle. This results in an ejector action in that the air entering the circular passage from the central opening imparts higher velocity to the engine air entering the circular passage through other openings whereby such air with its increased velocity adequately atomizes the liquid fuel for start-up and low power operations. This type of "ejector" action is known in other applications and is disclosed, for example in Marks' Mechanical Engineers Handbook, Sixth Edition, Page 9-99, published by McGraw-Hill, New York in 1958 but has not been applied to fuel nozzles in the manner herein disclosed.

DETAILED DESCRIPTION

FIG. 6 is a cross section view through a simple form of the invention.

Figure 1:
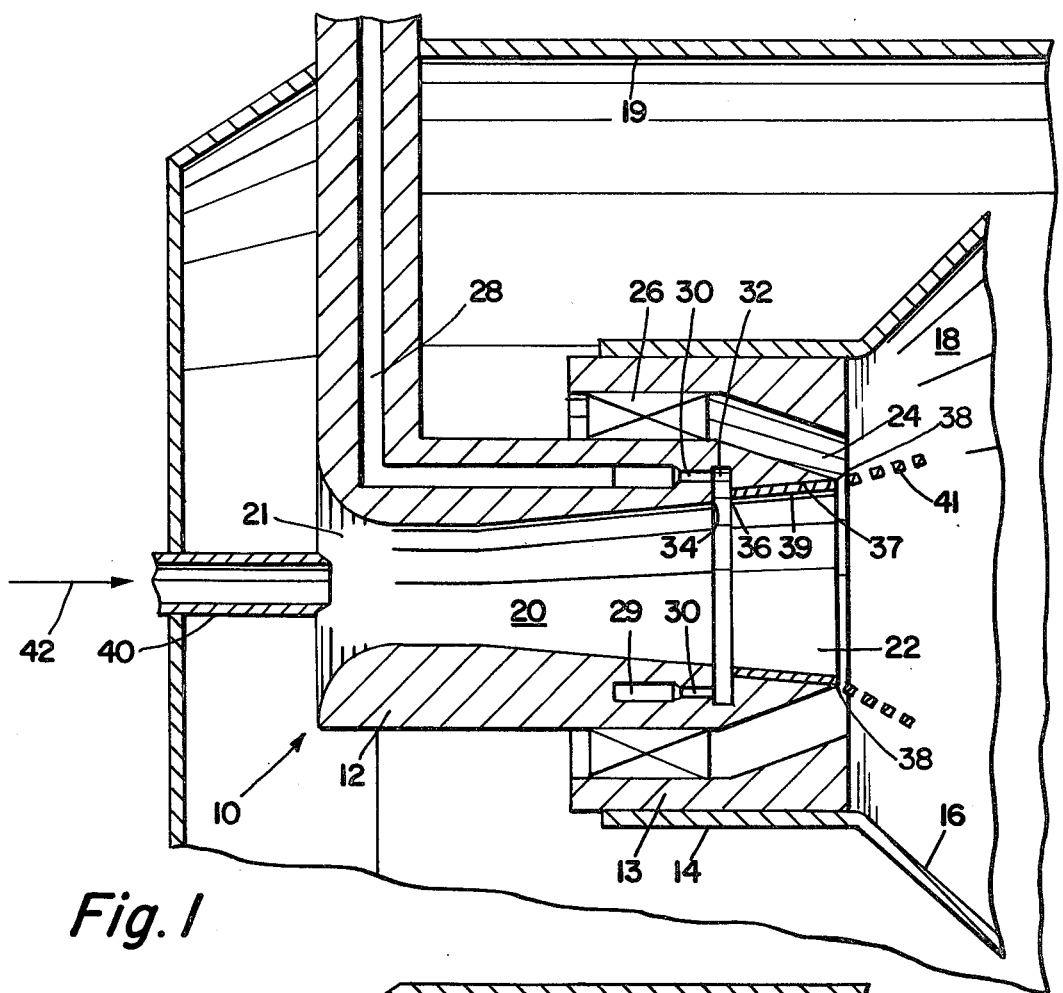

In the form of the invention shown in FIG. 1, a nozzle 10 includes a nozzle body 12 that has a generally circular portion 13 that fits into a tubular extension 14 of a container 16 that forms a combustion chamber 18 located within a gas turbine air manifold 19. Body 12 has an air passage 20 of circular cross section and having an inlet portion 21 open to manifold 19 and an exit portion 22 open to combustion chamber 18. Passage 20 is of convergent-divergent shape with the convergent end 21 being bell-mouthed to provide a smooth entry for engine air into exit portion 22. Body 12 also has an annular passage 24 with swirl vanes 26 therein at its inlet end and through which engine air from within manifold 19 is also delivered to combustion chamber 18.

A fuel passage 28 in body 12 communicates fuel from a source exterior to manifold 19 to an annular fuel chamber 29 and then to a plurality of tangentially directed swirl producing orifices 30 which lead to annular groove 32 that intersects passage 20. Orifices 30 produce a free vortex of liquid fuel in groove 32. Groove 32 has circular edges 34, 36 where it intersects passage 20. Edge 34 has a slightly smaller diameter than edge 36 so that the liquid fuel, after it passes through groove 32 forms a thin film or sheet 39 on the wall 37 of exit portion 22.

A tubular conduit or tube 40 is provided in conjunction with body 12 and, in the form of the invention shown in FIG. 1, may be separate of such body. Tube 40 is connected to a source 42 of fluid such as compressed air, that is separate of the engine compressor and projects a small distance into bell-mouth inlet portion 21 of passage 20 but terminates upstream of the smallest diameter portion of passage 20.

During operation of the FIG. 1 form of nozzle, fuel entering nozzle body 12 through inlet passage 28 passes through orifices 30 into groove 32 and is acted upon by air passing through passage 20 to flow outwardly in the form of a thin sheet or film 39 along surface 37. When the fuel sheet reaches outer edge 38 of surface 37 it is also acted upon by air passing through passage 24. The flowing air from passages 20 and 24 causes breakup of the thin sheet of fuel into small drops 41 when the sheet leaves edge 38, this process being known as atomization. The resulting spray of atomized fuel is carried downstream by the air to feed the flame in combustion chamber 18. Preferably, the atomized fuel spray is conical and has an included angle of about 80° to 90°.

For satisfactory atomization, the air acting on the liquid fuel as the latter leaves edge 38 must be at high velocity. During normal operation of the engine at high power levels, the engine compressor is rotating at sufficiently high speed to produce sufficient velocity in the air flowing through nozzle passages 20, 24 from manifold 19 to cause good atomization of the liquid fuel as it leaves edge 38. However, at start-up and low power operation of the engine the compressor is operating at relatively low speed and may not produce sufficient velocity of the air flowing from manifold 19 through nozzle passages 20, 24 to achieve the desired atomization. Thus, at these times the separate fluid source 42 is actuated to produce flow of air at high velocity through tube 40 into the central portion of nozzle passage 20. This high velocity air discharging from tube 40 imparts high velocity to the low velocity air entering passage 20 from the interior of manifold 19 so that the air within passage 20 is at high velocity when it acts upon the liquid fuel leaving edge 38 to thus achieve good atomization when the engine is starting up or operating at low power levels.

By having tube 40 only partially enter bell-mouth entrance 21 of passage 20 there is no significant restriction of flow of engine air into passage 20 during high power operation of the engine when no compressed air is supplied through tube 40 and therefore tube 40 has no significant adverse effect on the normal functioning of the nozzle at such high power operation of the engine.

If space permits the nozzle to have a central engine air passage 20 that is relatively long in relation to its average diameter, as shown in FIG. 1, then the use of a plain tube 40 which imparts no swirl to the air passing therethrough will usually be satisfactory. However, if space requirements dictate that passage 20 be relatively short as compared to its diameter, then it is preferred to construct the nozzle in the manner shown in either FIG. 2 or FIG. 4.

Figure 2:
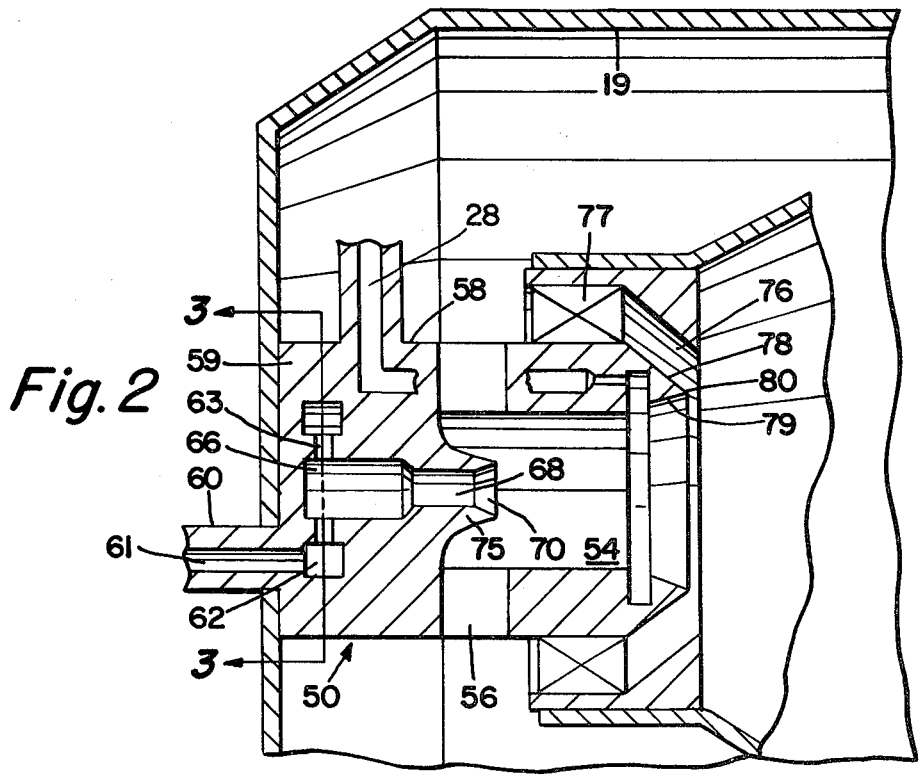
FIG. 2 is a cross section through a preferred form of the invention.

In the form of nozzle 50 shown in FIG. 2, nozzle body 58 has a central passage 54 which receives engine air from manifold 19 through radial apertures 56 which are tangentially disposed with respect to passageway 54 so as to produce a swirling air flow in the latter. The fuel feed passages are the same as in FIG. 1 and thus are identified with the same reference numerals.

Nozzle body 58 includes a rear section 59 having a tubular inlet portion 60 which has a single passage 61 that connects with an annular chamber 62 which in turn communicates with tangential openings 63 that lead to a central chamber 66. Chamber 66 connects via a reduced diameter bore 68 with a flared opening 70 in a tubular projection 75. Body 58 also has an annular passage 76 with swirl vanes 77 therein. An inner conical surface 78 of passage 76 intersects flared exit portion 79 of passage 54 at an edge 80. The tangential openings 63 produce a swirling action of the air within chamber 66 and bore 68. The tangential direction of passages 63 is the same as the tangential direction of passages 56 so that air entering passage 54 from bore 68 is rotating in the same direction as air entering passage 54 from passage 56 and the highest air velocity is concentrated near the walls of exit passage portion 79 which results in the most effective atomization of liquid fuel at edge 80. With this air swirling arrangement the air in the central part of passage 54 and portion 79 has relatively low velocity, which is helpful in stablizing the burning process in the combustion chamber. As with FIG. 1, placing of the separate air supply passage in the central portion of passage 54 results in an ejector action that imparts high velocity to the engine air entering passage 54 through radial openings 56 so that the high velocity air will adequately atomize the liquid fuel as it leaves edge 80 during start-up and low power operating conditions. Also, placing of projection 75 in the central portion of passage 54 does not significantly restrict air flow into passage 54 through passage 56 during high power operation of the engine when the secondary supply of air through passage 61 is shut off.

Figure 4:
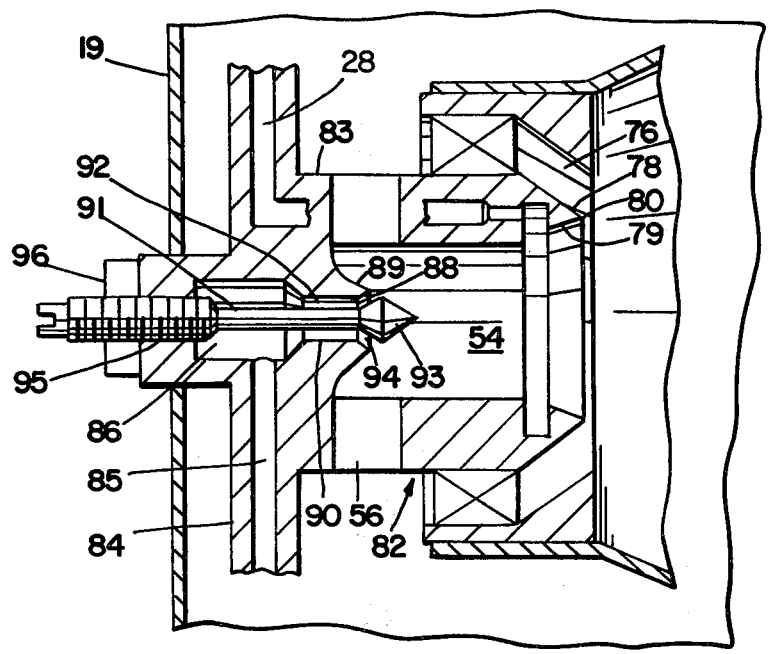
FIG. 4 is another form of the invention.
Figure 3:
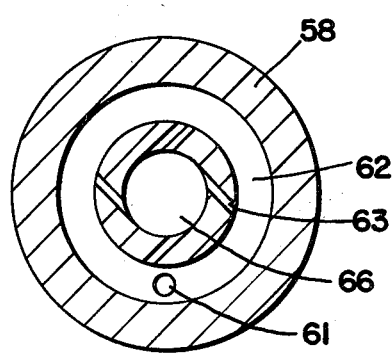
FIG. 3 is a section view along the lines 3—3 of FIG. 2.

The form of nozzle 82 shown in FIG. 4 is similar in some respects to nozzle 50 of FIG. 2 and like portions have like reference numerals. In this form, air from a source other than the engine compressor enters body 83 through a radially extending tubular portion 84 having a bore 85 therein that tangentially connects with chamber 86. The latter communicates with a flared opening 88 in a tubular projection 89 via a reduced diameter bore 90.

A pintle 91 is received in reduced diameter bore 90 forming an annular flow path 92 therebetween. A head 93 on pintle 91 is shaped as shown forming an outwardly flared discharge passage 94 between head 93 and flared portion 88 of bore 90 so that the air emerges therefrom in a generally conical configuration. One end of pintle 91 is in threaded engagement with body 83 at 95 permitting adjustment of the width of annular discharge passage 94 which, in turn, affects the volume, velocity and included angle of the conical air spray exiting therefrom. Such adjustment gives a more accurate control of the quantity and velocity of air passing through passageway 54. A jam nut 96 locks the position of pintle 91 with respect to body 83 after the desired pattern and quantity of spray has been obtained.

In a test of the form of the invention shown in FIG. 1 it has been found that satisfactory atomization of fuels having viscosities of up to 12 centistokes was obtained with air from a separate source supplied through tube 40 at about 5 psi when the engine air pressure drop was about 0.5 inches of water head. The quantity of air from the separate source was small in relation to the supply of engine compressor air through the nozzle for proper combustion, i.e., expressed as a mass ratio to the fuel flow, this quantity of air from the separate source was only 10% to 20%, which is approximately 1% in relation to the quantity of air required for complete (stoichiometric) combustion.

This invention provides a flexible and satisfactory means for overcoming the aforementioned disadvantages and problems of prior fuel nozzles. Satisfactory spray pattern and fuel atomization can be obtained throughout the entire range of engine operation from start-up to high power output. Although it is not necessary to do so, the air from the external source can be used along with air from the engine for start-up and throughout the entire operating range of the engine.

Another use of this invention is for controlling the formation of nitrogen oxides in the exhaust emissions of a gas turbine engine. This may be accomplished by introducing steam instead of air from the external source through tubes 40, 60, or 80. The steam will impart high velocity to the engine air to obtain good atomization at engine start-up and low power operation and, in addition, the steam when it enters the combustion chamber minimizes the formation of nitrogen oxides in the exhaust emissions. Because it is at high power operation, rather than start-up or low power operation, where control of nitrogen oxide emissions is of greatest importance, the steam would continue to be supplied during the high power operation. The same general effects can be obtained by using liquid water instead of steam.

Other gases, sch as oxygen or nitrogen, may be introduced through tubes 40, 60, or 80 in the same manner as air or steam to improve atomization of the fuel or to introduce a desired substance into the combustion chamber without significantly interfering with the operation of the nozzle as an "air blast" type wherein it utilizes engine air for atomization of the fuel. For example, oxygen may be used to improve the ignitability of certain fuels under adverse conditions such as variable fuel and/or air temperature. Nitrogen or some other chemically inert gas may be used to modify the combustion reaction rate or to minimize the formation of carbon on the fuel nozzle surfaces by delaying the combustion reaction. Thus, the invention can perform a variety of functions simply by changing only the nature of the fluid introduced through tubes 40, 60, or 80.

We claim:

1. A fuel atomizing nozzle for gas turbine engines, said nozzle including a passage for fuel terminating in a discharge orifice, a first passage for air to be received from the engine and communicating with the fuel passage upstream of the orifice, a second passage for receiving high velocity fluid from a source separate of the engine, said second passage comprising a tubular conduit located centrally of a portion of the first passage and projecting into said first passage, said first passage being unobstructed except for said tubular conduit, whereby said high velocity fluid discharging from said tubular conduit into said portion of the first passage imparts high velocity to the air from the first passage flowing to said orifice.

2. The nozzle of claim 1 in which said first passage has inlet and outlet ends and has a portion intermediate said ends of smaller diameter than the diameters at said ends, and said tubular conduit projects into said inlet end and terminates upstream of said intermediate portion.

3. The nozzle of claim 1 further including an annulus interposed between said fluid source and said second passage for communicating said fluid therebetween, said annulus causing swirling of said fluid passing therethrough and in said second passage resulting in the increased atomization of said fuel as it exits from said orifice.

4. The nozzle of claim 3 further including means in said tubular conduit for adjusting the volume and velocity of said fluid from said source.

5. A fuel atomizing nozzle for gas turbine engines, comprising a body member adapted for positioning in the air manifold of the gas turbine engine, said body member having a central, unobstructed, circular cross-section passage therein with an inlet and an outlet communicating respectively with the manifold and combustion chamber of the engine, an annular fuel passage in said body member having tangential swirl-producing orifices adapted to swirl fuel in said central passage near the outlet thereof to be acted upon by engine air passing through said central passage, an annular air passage in said body member communicating the engine air manifold and the combustion chamber, said air passage surrounding said central passage outlet and having swirl-producing means therein for swirling air passing therethrough into engagement with fuel from said central passage, and an auxiliary fluid orifice centrally located in said central passage near said inlet thereof and positioned to direct the flow of auxiliary fluid away from said inlet and toward said outlet of said central passage to assist the flow of engine air therethrough.

6. The fuel nozzle as set forth in claim 5 further including means for imparting swirl to the auxiliary fluid.

7. The fuel nozzle as set forth in claim 6 further including means for imparting swirl to the engine air passing through said central passage prior to combination of such engine air with the auxiliary fluid.

8. The fuel nozzle as set forth in claim 7 wherein said auxiliary fluid orifice is the outlet of a tubular conduit positioned at said central passage inlet.

* * * * *